United States Patent [19]
Whitney

[11] Patent Number: 5,077,941
[45] Date of Patent: Jan. 7, 1992

[54] AUTOMATIC GRINDING METHOD AND SYSTEM

[75] Inventor: Daniel E. Whitney, Arlington, Mass.

[73] Assignee: Space Time Analyses, Ltd., Arlington, Mass.

[21] Appl. No.: 523,599

[22] Filed: May 15, 1990

[51] Int. Cl.⁵ .............................................. B24B 49/00
[52] U.S. Cl. .............................. 51/165.71; 51/165.87; 51/326
[58] Field of Search ................. 51/165, 165.87, 165.71, 51/401, 404, 407, 326

[56] References Cited

U.S. PATENT DOCUMENTS

| | | | |
|---|---|---|---|
| 3,844,172 | 10/1974 | Haigh et al. | 51/401 |
| 4,337,566 | 7/1982 | DiMatteo et al. | 51/326 |
| 4,523,409 | 6/1985 | DeFazio | 51/165.77 |

OTHER PUBLICATIONS

Grinding, Norton Company, 1922, p. 69.

Primary Examiner—M. Rachuba
Attorney, Agent, or Firm—Iandiorio & Dingman

[57] ABSTRACT

An automatic grinding system and method for grinding a surface having a predetermined pattern of raised and lower regions includes sensing the width of at least one of those regions; determining the height of the raised region above the lower region in response to the sensed width; and selecting the grinding speed and force and the velocity of the grinder over the surface in response to the determined height of the raised region.

16 Claims, 10 Drawing Sheets

A. TV VIEW EARLY IN GRINDING

B. TV VIEW LATER IN GRINDING

C. TV VIEW WHEN GRINDING IS ALMOST DONE

AUTOMATIC GRINDING METHOD AND SYSTEM

GOVERNMENT RIGHTS

This invention was made with Government support under DMC-85-15214 awarded by the National Science Foundation. The Government has certain rights in this invention.

FIELD OF INVENTION

This invention relates to an automatic grinding method and system, and more particularly to such a method and system which determines grinding speed and force as a function of the width of raised and lower machined regions on a surface to be ground.

BACKGROUND OF INVENTION

Stamping dies are cut to exact shape but rough finish using numerically controlled machining. A machining cutter with a "ball nose" is used to create the rough surface, which has a scalloped or grooved appearance after cutting. The bottoms of the grooves are at the desired final surface level, so the scallops must be removed. At present this is done manually and takes a long time. When the die is almost completely finished, slight residues of the groove bottoms may still be seen.

Alternate "automatic" methods exist. One of these involves another type of numerically controlled machining, using a flat nose cutter which is "nutated" as it spins. The result is a surface that has a segmented flat appearance as if it had been finished by a spatula. Some additional finishing is still required. However, there is no reference indicating where the final desired surface lies. A person grinding such a die does not know when to stop; he can make the surface smooth but cannot tell when it is at the correct level. For this reason, the nutating cutter method is not widely used.

Another existing "automatic" method is a type of machine called a die polisher. Such a machine works on dies machined by ball-nose cutters and uses a small cutting disk to smooth local regions of the die. Polishing of each region is done by manually recording a series of points. The machine moves the polishing head in a fixed pattern through the series of taught points a fixed number of times or until the human operator stops it. It performs no measurements and cannot determine when it has finished the die to the desired shape. The cutting disks are small and require that the original grooves be small and close together, requiring in turn increased machining time prior to polishing. Such a machine also requires manual teaching and manual attention.

SUMMARY OF INVENTION

It is therefore an object of this invention to provide an improved automatic grinding method and system.

It is a further object of this invention to provide such a method and system which can determine when grinding has progressed to the proper level.

It is a further object of this invention to provide such a method and system which automatically adjusts the speed and force of the grinder on the surface to be ground and the velocity of the grinder over the surface.

It is a further object of this invention to accomplish highly accurate grinding without requiring correspondingly high accuracy apparatus.

The invention results from the realization that a truly effective, precise and reliable automatic grinding system can be effected by sensing the absolute or relative width of at least one of the unground raised regions or lower regions representing the final surface level to be achieved and calculating from that width or widths, the height of the raised regions above the lower regions and driving a grinder to operate at a grinding speed and a force and a velocity over the surface to grind away the raised regions until the lower regions are reached.

This invention features an automatic grinding system for grinding a surface having a predetermined pattern of raised and lowered regions. There are means for grinding the raised regions down to the level of the lower regions and means for controlling the grinding force, the grinding speed and the velocity over the surface of the means for grinding. There are means for sensing the width of at least one of the regions and means responsive to the means for sensing for determining the height of the raised regions above the lower regions. Means responsive to the means for determining the height drive the means for controlling to set the grinding speed and force and the velocity over the surface of the means for grinding.

In a preferred embodiment, the means for grinding includes a robot arm. It may also include a grinder and the grinder may include a flexible member for supporting the grinding medium. The grinder may be a rotary grinder, and the flexible member may be a disk. The means for grinding may include a grinding medium approximately 50-120 grit. The means for controlling may include a robot controller and the means for sensing may include a TV camera. The means for driving includes mean for detecting the force applied between the means for grinding and the surface. The means for driving also may include means for ascertaining the grinding speed of the means for grinding.

The invention also features an automatic grinding method for grinding a surface having a predetermined pattern of raised and lowered regions. The width of at least one of the regions is sensed, and from that the height of the raised regions above the lower region is calculated. The grinding speed and the force, and the velocity of the grinder over the surface, is then calculated in response to the determined height of the raised region.

DISCLOSURE OF PREFERRED EMBODIMENT

Other objects, features and advantages will occur to those skilled in the art from the following description of a preferred embodiment and the accompanying drawings, in which:

FIGS. 4A, B and C illustrate TV images early in the grinding, partway through the grinding and when the grinding is almost done, respectively;

The invention may be accomplished using a robot or other articulated device that carries a grinding tool. There is a force sensor, grinder RPM sensor, and a TV camera. A computer controls the robot so as to guide the grinding tool over the surface of the die in back-and-forth passes repeatedly, while measuring the applied grinding force. The TV observes the state of the die surface and the computer uses the TV pictures to determine how much material remains to be ground off. The invention utilizes the fact that the bottoms of the lower regions or grooves represent the desired final surface. The grinder need merely grind off all the material that protrudes up and above the groove bottoms, maintaining a "fair" surface between groove bottoms. Thus the die itself defines its own desired shape. While throughout the illustrated specific embodiment the lower regions are shown as grooves, that is, elongated parallel channels, this is not a limitation of the invention. For example, the surface pattern of raised and lower regions may be two-dimensional, such as a honeycomb or eggcrate configuration, or any other regular or irregular pattern.

The computer can tell from the TV picture how much material protrudes up by calculating the width of either the raised region (the ground surface) or the lower region (the remaining unground groove region). The TV image is enhanced if the die is painted with common dark blue layout die prior to grinding. As grinding proceeds, the ground regions will be shiny and bright while the unground regions will be contrastingly dark, making a good TV image available. This image will consist of alternating light and dark stripes.

Figure 1:
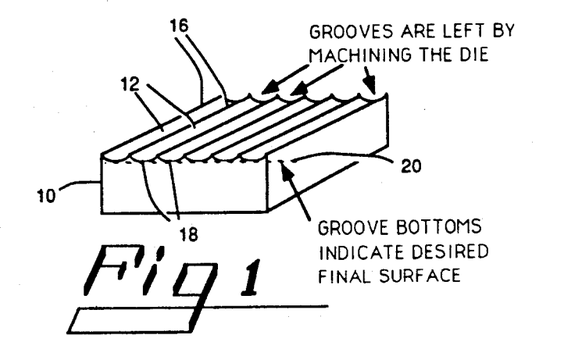
FIG. 1 is a three-dimensional view of a grooved die to be ground.
Figure 2:
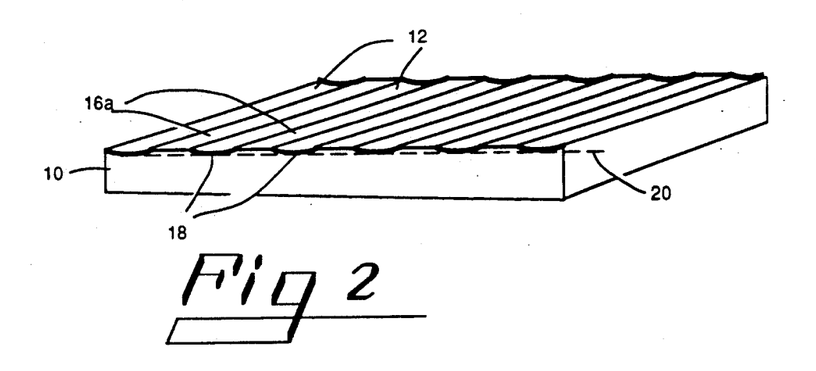
FIG. 2 is a view of the die of FIG. 1 with a portion already ground showing the flat raised regions.
Figure 4:
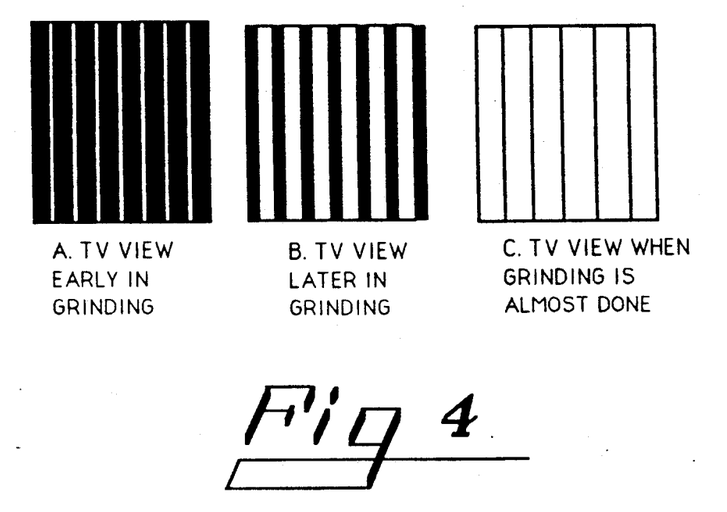

When the surface to be ground is a die 10, FIG. 1, formed by machining with a ball-nose cutter, the shape of the lower region or grooves 12 is circular in cross-section between the raised regions or tops 16. The bottoms 18 of the grooves define the final desired surface 20. As grinding proceeds, the sharp tops are cut off, leaving flat tops 16a, FIG. 2. Simple geometry can be used to derive the relationship $h = w^2/8R$. This equation shows that the height can be determined extremely accurately due to the square law nature of the equation. For example, suppose that the cutter radius R is 0.5" and the unground width of the groove w is 0.1". Then the height h is 0.0025". This height is very small and is nearly small enough that grinding can stop. However, the groove is still quite wide and is therefore easily seen by the TV. When the height is a quite satisfactory 0.001" the width is still over 0.06" which is wider than a broad pencil line and easily seen. A sequence of TV images, FIG. 4, illustrates the grinding progression.

Figure 3:
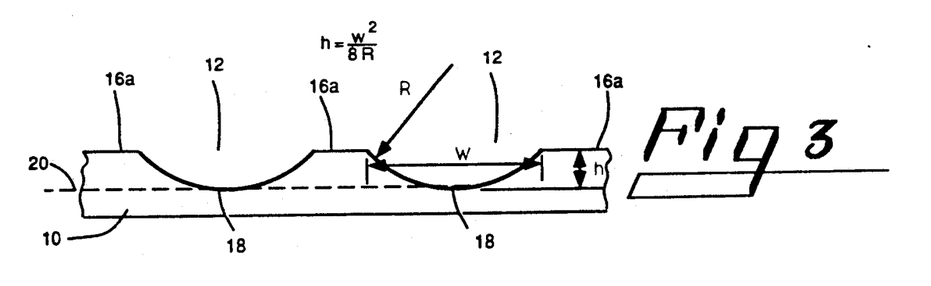
FIG. 3 is an enlarged detail view of a portion of the die of FIG. 2 showing the pertinent dimensions.
Figure 5:
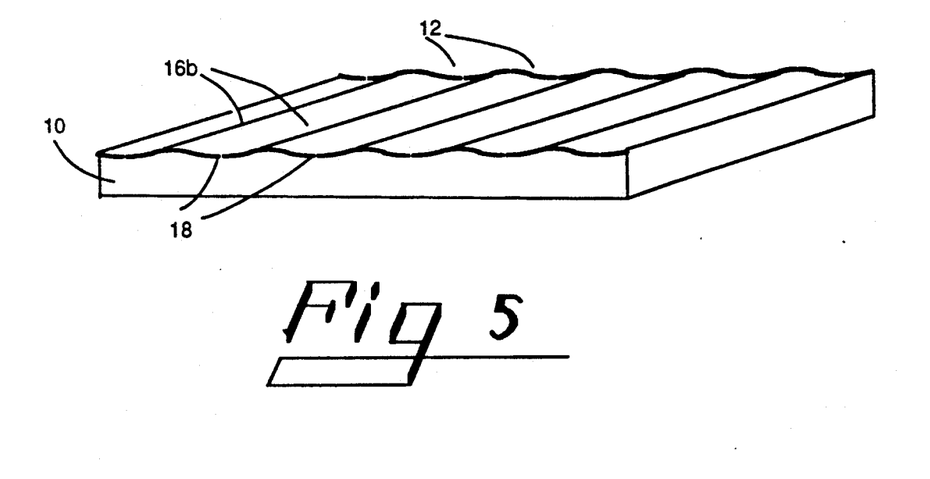
FIG. 5 is a view similar to that shown in FIG. 2 showing the rounded tops that result from improper grinding.

In order for this equation to be accurate, the surface must be ground so that the tops of the ground surfaces are flat as shown in FIG. 3 and not rounded as in FIG. 5. If the tops are rounded 16b then the TV will see narrow dark stripes and the computer will conclude incorrectly that the surface is nearer to being completely ground than is the case in fact.

Flat tops are obtained by using the correct grinding procedure. The one found to be the best consists of the following: A flexible grinding disk is used. Such a disk consists of a rubber or plastic base onto which is placed a paper or composition abrasive disk. This disk conforms to the main curvature of the die if it is curved, or to the flat surface if the die is substantially flat. The diameter of this disk must be larger than about five grooves so that it will not grind into the grooves and destroy the bottom reference level.

Making the disk large is necessary but is not sufficient to prevent damage to the groove bottoms and to keep the tops flat. In addition, grinding with too rough an abrasive must be avoided; that has been shown experimentally to cause rounded tops and grinding into the grooves. Experimentally it has been determined that flat tops are obtained by using a relatively fine abrasive, at least at intermittent intervals during the grinding. Fine abrasives can restore rounded tops to a flat condition and a new coat of dye can be applied, allowing accurate height measurements to be made.

If the die surface is flat or nearly flat, a rigid grinding wheel or a belt sander can be used as long as care is taken in how it is attached to the robot and as long as the force control software is properly adjusted. A flexible disk may still be necessary for final finishing.

Figure 6:
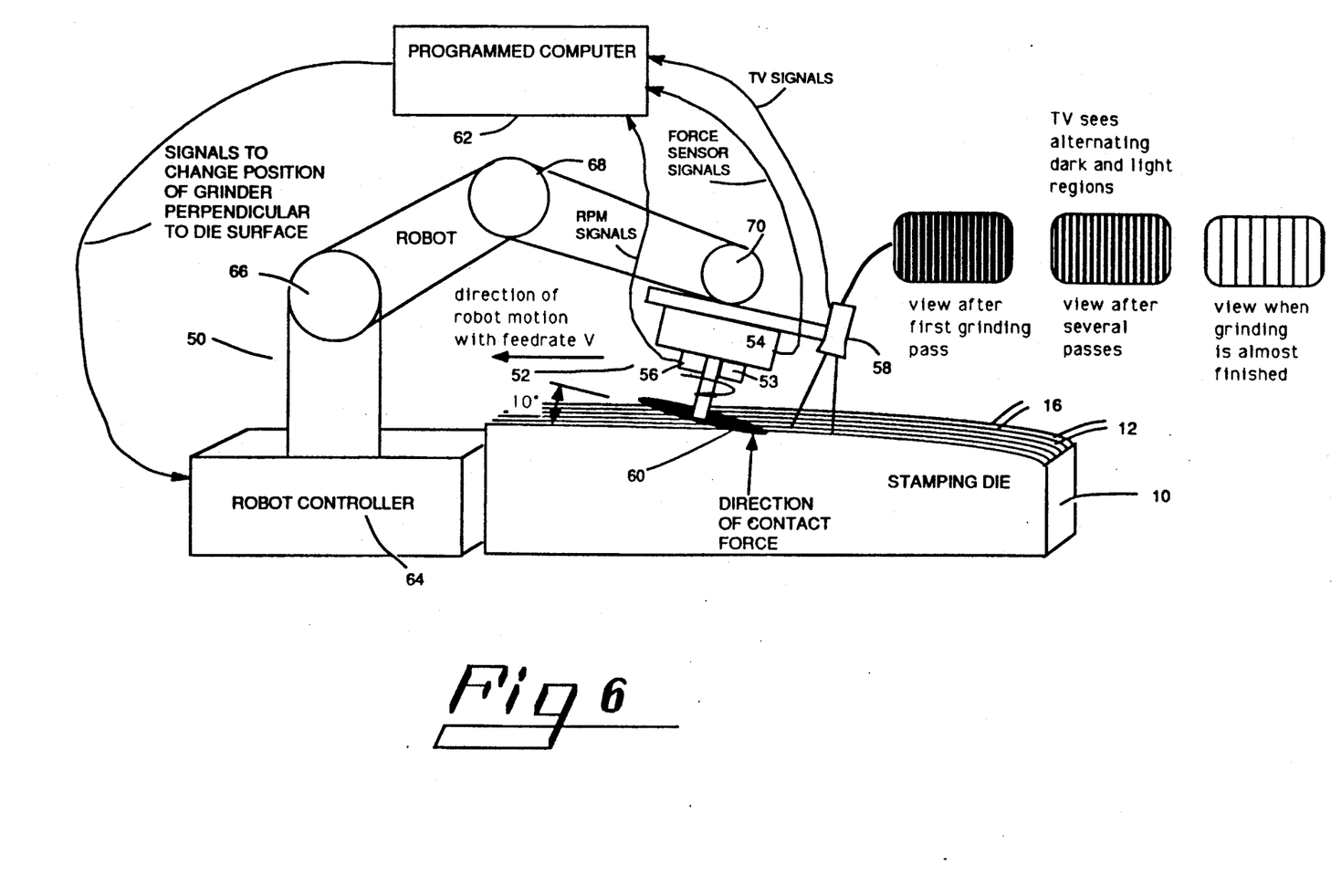
FIG. 6 is a schematic block diagram of one embodiment of this invention.

There is shown in FIG. 6 a system according to this invention including a robot 50 equipped with a grinder 52, a robot tool changer 53, force sensor 54 to sense contact grinding force (normal to the disk and die surface) and tangential grinding force (parallel to the disk and die surface), a tachometer 56 to measure the RPM of the disk ("grinding speed"), and a TV camera 58 to view the surface of the die 12. Grinder 52 may be air or electric powered. Note that each of these can be bought commercially. Robot 50 is PUMA 560 from Westinghouse. Force sensor 54 is from Barry Controls, Watertown, Mass. Grinder 52 is from Milwaukee Tool Co.

The grinding disk 60 should be of the flexible type, using a paper disk coated with abrasive grit and supported by a flexible backing typically made of rubber or plastic. The grit size should be in the range of about 50 to 120. It has been found experimentally that grit sizes in the range 50 and finer will maintain the tops of the ground-off cusps quite flat, permitting accurate measurements as described.

Commonly available digital TV's 58 have an image plane that is divided into individual light-sensitive "pixels". Typically the pixels are in a square array of 512 pixels in each row, with 512 rows. The electronics associated with such cameras permit a computer to measure the location of light and dark regions on the image plane to an accuracy of one pixel. Such a camera might be located 6" from the die and see a region about 2" square. Using similar triangles, it can be estimated that each of the pixels corresponds to a region on the die approximately 0.004" square (obtained by calculating 2/512). The exact value is obtained by calibration, that is, by observing patterns of known size and counting how many pixels they cover. Thus, in theory, patterns or lines as narrow as 0.004" can be detected.

Computer 62 or another electronic device reads each of the sensors: force sensor, tachometer, TV. Each of these can be bought commercially. The TV 58 typically plugs into a computer and permits the image to be represented in computer memory and displayed on a screen if desired. The degree of darkness of each pixel is represented as an individual number in the computer memory ranging in value from 0 for pure white to 255 for pure black. Commercial software is available for performing such calculations as processing the image, enhancing it, and comparing the darkness of different pixels. TV, electronics to plug into the computer, and software may be bought from Imaging Technology, Inc., of Woburn, Mass. The computer 62 also drives the robot controller 64 that operates robot 50.

Computer 62 interprets the TV view of the surface of the die for the purpose of determining the relative widths of dark and light stripes and the width in inches or mm of each stripe. The latter calculation is performed by finding dark regions corresponding to dark stripes and counting how many pixels wide these regions are, and then using the calibration information to convert this count into inches on the die. If the dark regions become too small as grinding nears completion, one may observe the width of light regions, convert these to inches on the die and then subtract the value from the groove spacing (typically 0.25") to obtain the width of dark regions.

The remaining height of metal yet to be ground is calculated based on the measured dark widths. The relationship for remaining height h, based on measured dark width w, and cutter radius R as noted earlier, is $$h = w^2/8R. \tag{1}$$

Computer 62 decides how much of the remaining material to grind off during the next pass of the grinding disk over a region of the die, typically 50% to 75% of the remaining amount rather than 100% in order to avoid the risk of grinding off too much.

The contact force the robot should use while pushing the grinder against the die in order to remove the desired amount of material is calculated. Prior research has determined that metal removal rate Q is related to applied power P by the equation $$Q = K_1 P + K_2 \tag{2}$$

where $K_1$ and $K_2$ are constants related to the sharpness of the grinding grit, the grit size, and the material being ground; $K_1$ and $K_2$ are determined experimentally. The applied power is related to the contact force $F_N$ and disk speed $\omega$ by $$P = F_N r \omega \mu \tag{3}$$

where $\mu$ is the ratio of measured tangential grinding force to measured contact grinding force and r is the radius of the grinding disk out to the center of the region where the disk contacts the die.

If the robot moves the grinder across the die surface at velocity V, and if a fraction f of the remaining metal volume is to be removed, then the required downward force may be calculated from $$F_n = \frac{V[\sqrt{8Rh} - a]fh - K_2}{K_1 r \omega \mu} \tag{4}$$

where a is the spacing between grooves on the die surface and all the other quantities are measured during grinding or computed in advance.

Instead of using equation (4) in real time during the robot's motion, one can assume V, R, and $\omega$ are constant over wide regions of the motion and use equation (4) to plan in advance a history for $F_N$. Then during operation of the robot one can sense $\omega$, which is the most likely to vary, and adjust the commanded force according to the simpler relation $$F_{adjusted} = F_{planned} \frac{2\omega_{planned} - \omega_{sensed}}{\omega_{planned}} \tag{5}$$

Since according to equation (2) metal removal rate is proportional to applied power, equation (5) will keep the applied power equal to that planned.

It has been determined experimentally that a low value of V (typically one inch per second) will yield a very good surface finish, even if a rough grinding grit is used, due to the fact that the robot can maintain a very constant value for V.

A control program in robot controller 64 drives robot 50 and grinder 56 over the surface of die 10 while maintaining the grinding disk 60 at the correct angle and the downward force at the correct level.

The path of grinder 52 over die 10 may be calculated based on the shape of the die as originally machined by numerically controlled machine tools. Virtually all dies used in major industries are machined by NC methods. This shape is stored in a computer and may be read into the robot 50 by means that are known to those familiar with the state of the art. Software in the robot controller 64 can then convert this shape into commands to the robot joint motors 66, 68, 70 so as to drive the tip of grinding disk 60 over the die surface while maintaining disk 60 at the correct angle (typically 10°) relative to the die surface. Robot controller 64 through computer 62 responds to force sensor 54 if the force is too low or too high and drives disk 60 toward or away from die 12 respectively, according to the equation $$\Delta Z = (F_{desired} - F_{sensed})/K_{disk} \tag{6}$$

where positive $\Delta Z$ indicates a move that pushes disk 60 closer to die 12. $K_{disk}$ is the stiffness of the flexible disk backing behind the paper abrasive.

Figure 7:
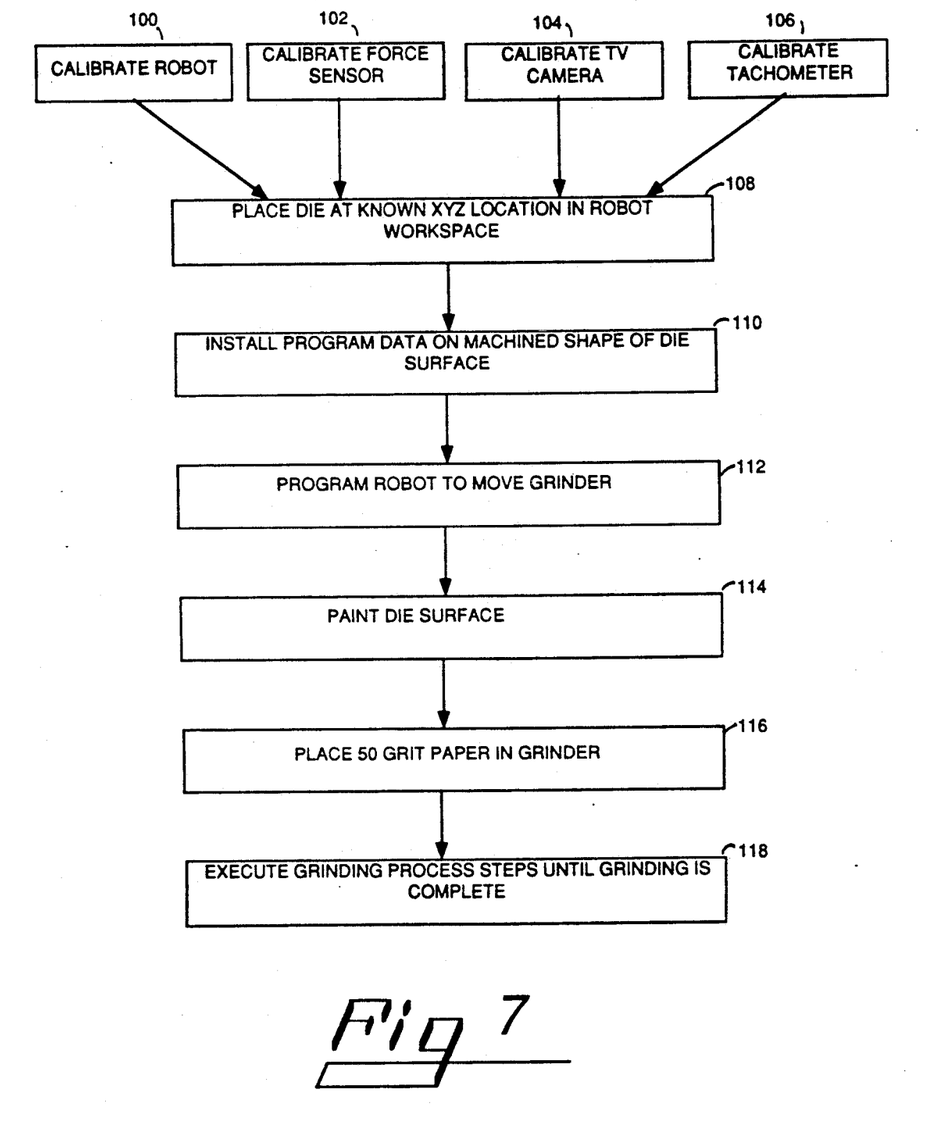
FIG. 7 is flow chart for setting up the method of this invention.

The system is initialized, or set up, as shown in FIG. 7. The software which operates the apparatus in accordance with the method of this invention is described in FIGS. 8-13. Initially, at setup, the robot, the force sensor, the TV camera and the tachometer are all calibrated, steps 100, 102, 104, 106, FIG. 7. The die is then placed at a known XYZ location in the robot workspace, step 108, and then the program data on the machined shape of the die surface is read, typed, or electronically transferred, step 110, into the robot controller. The data is in the form of XYZ coordinates. The robot's control language is then used, step 112, to program the robot to move the grinder over the die surface in partially overlapping strips in order to pass the grinder tip through coordinate points representing the die surface while keeping the grinding disk at a 10° angle to the surface. The die surface is painted in step 114 with a dark contrasting dye, and an abrasive paper such as 50 grit is placed on the grinder 116. After this the system is ready to operate, and in step 118 the execution of the grinding process begins and continues until the grinding is complete.

Figure 8:
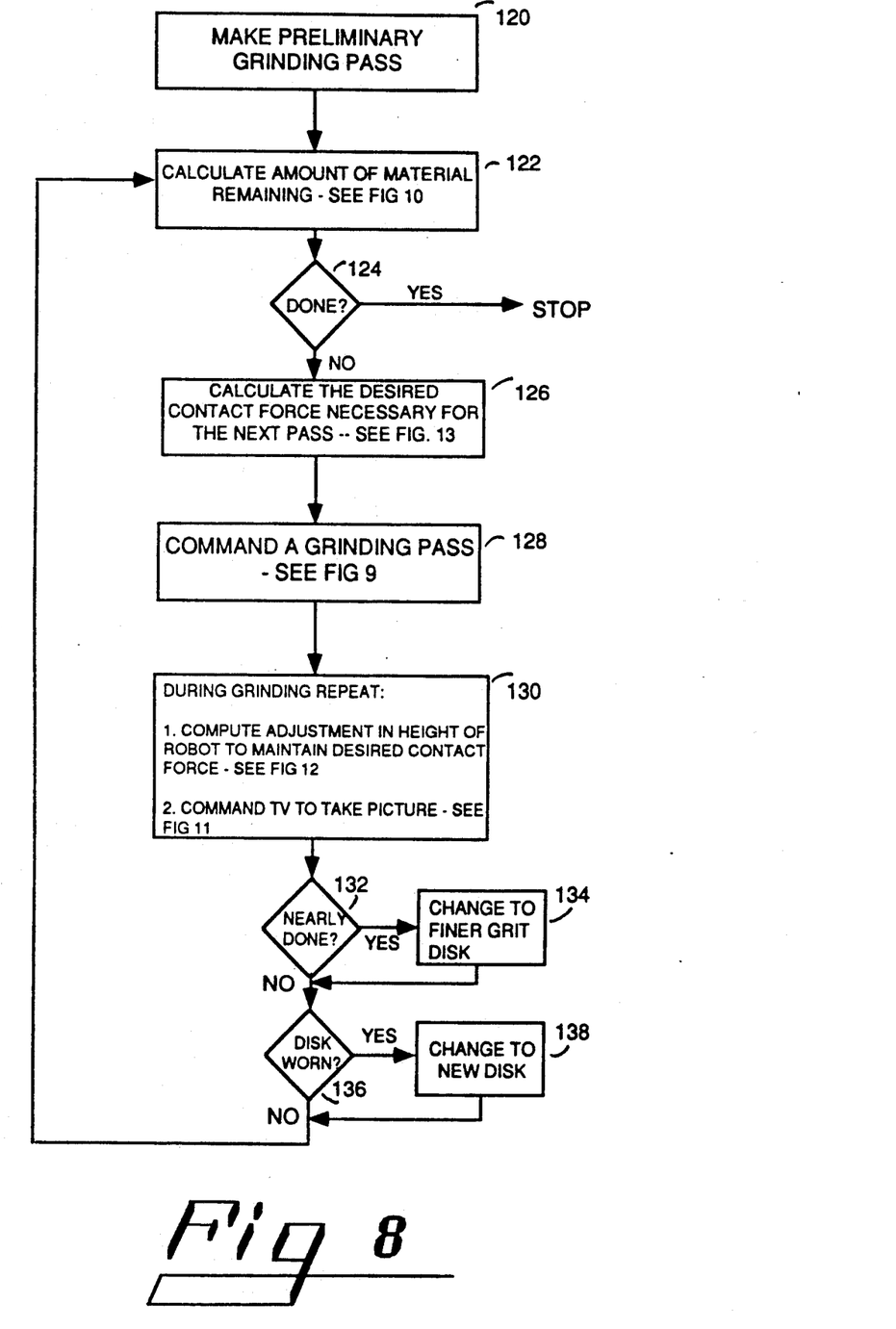
FIG. 8 is a flow chart of the grinding process, commands and calculations carried out by the computer.

The grinding process controlled by the computer begins with the making of a preliminary grinding pass step 120, FIG. 8, over all or part of the die, using, for example, five pounds of contact force. The amount of material remaining is calculated in step 122. If the grinding is done, step 124, the system is stopped. If not, the desired contact force necessary for the next pass is calculated in step 126, and a grinding pass is commanded to begin in step 128. During the grinding pass, every t milliseconds (for the PUMA 560, t is 28 ms), routine 130 is followed whereby the height of the robot is adjusted to maintain the desired contact force. At less frequent intervals, the TV is commanded to take a picture. At the end of the pass, the inquiry is made in step 132 as to whether the grinding procedure is nearly done: that is, if w is nearly zero. If it is, then the grinder changes to a finer grit in step 134. If it is not, inquiry is made in step 136 as to whether the disk is worn. This is determined by calculating if $\mu$ has fallen below a preset level, typically 0.2. If it is, in step 138 the disk is changed. If the disk is not worn the system loops back to step 122 to once again calculate the amount of material remaining.

Figure 9:
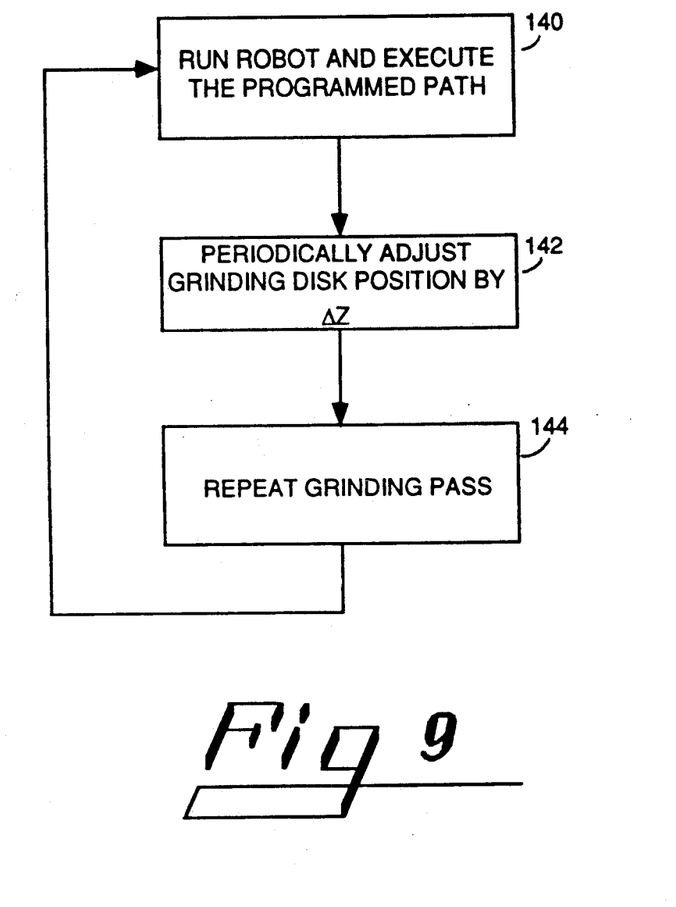
FIG. 9 is a flow chart of the actions of the robot controller involved in making a grinding pass.

To accomplish the above cycle, the following equipment and actions are employed: The robot controller contains its own routines for controlling the making of a grinding pass, as indicated in FIG. 9, where in step 140 on command of the programmed computer, the robot runs and executes the path programmed into it in step 112, FIG. 7. Following this, in step 142, while the program is running, it accepts inputs $\Delta Z$ from the programmed computer every t ms commanding that the grinding disk be moved closer to or farther from the die surface, thereby increasing or decreasing the contact force to maintain the desired force level. The command to make repeated passes if instructed by the computer, is made in step 144, and the system is returned to step 140 to rerun the path or begin another.

Figure 10:
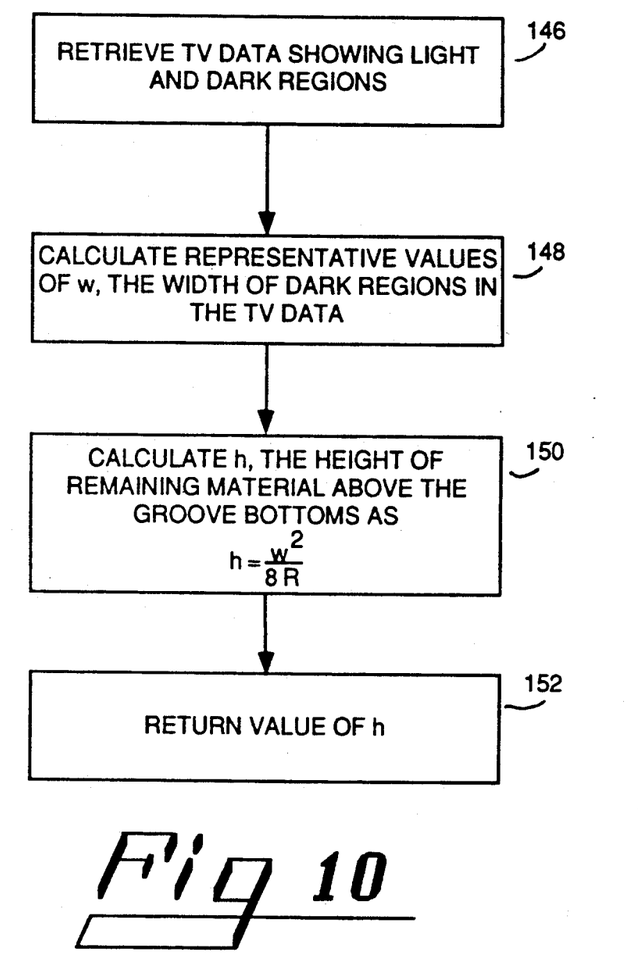
FIG. 10 a flow chart of the computations done by the programmed computer to determine the amount of material remaining to be ground.

The computer calculates the amount of material remaining to be removed as shown in FIG. 10, by first retrieving in step 146 the TV data showing light and dark regions, and then calculating in step 148 representative values of w, the width of the dark regions in the TV data. Following this in step 150, the height h of the remaining material above the groove bottom is calculated according to the expression $h = w^2/8(R)$. Then the value of h is returned to memory, step 152, to be used in step 172.

Figure 11:
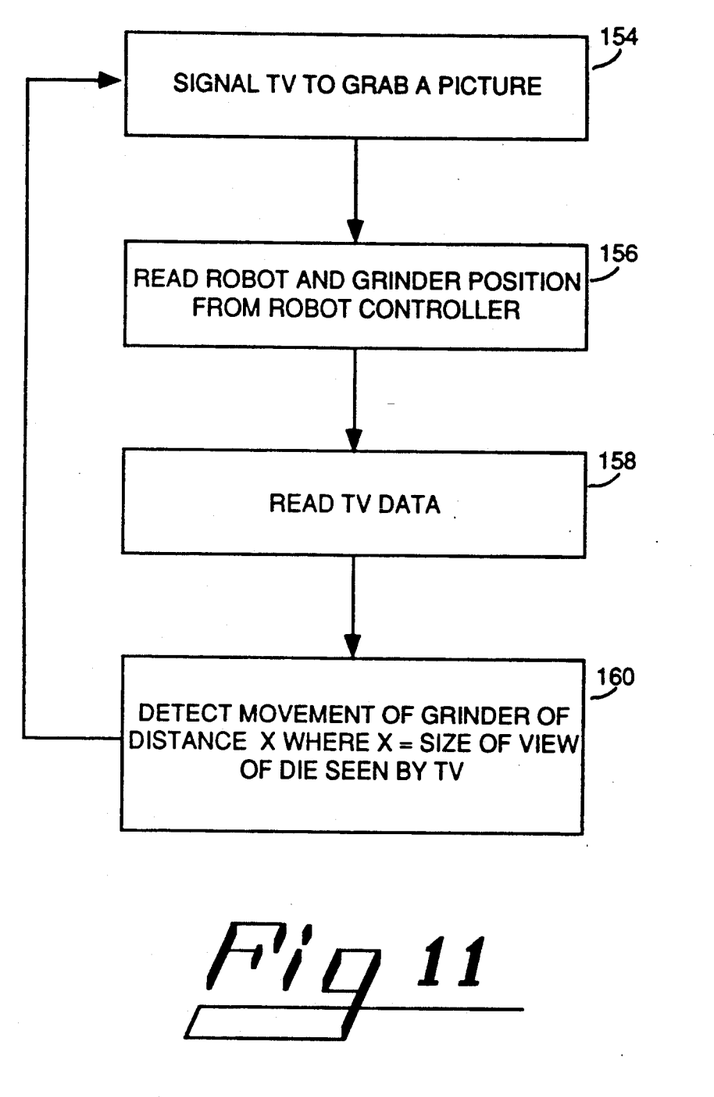
FIG. 11 is a flow chart of a routine for operating the TV camera to snap a picture and store it in memory.

TV camera operation is effected by a signal to the TV, step 154, FIG. 11, to snap or grab a picture. The robot grinder position is then read from the robot controller, step 156, and the TV data is read, step 158, and stored in memory along with data representative of the location of the grinder and die when the picture was snapped or grabbed.

Subsequently, in step 160, the system waits until the robot has moved along the die a distance X, where X equals the size of view of the die seen by the TV. When a new view of the die is presented, the system then loops back to step 154 and the new picture is snapped.

Figure 12:
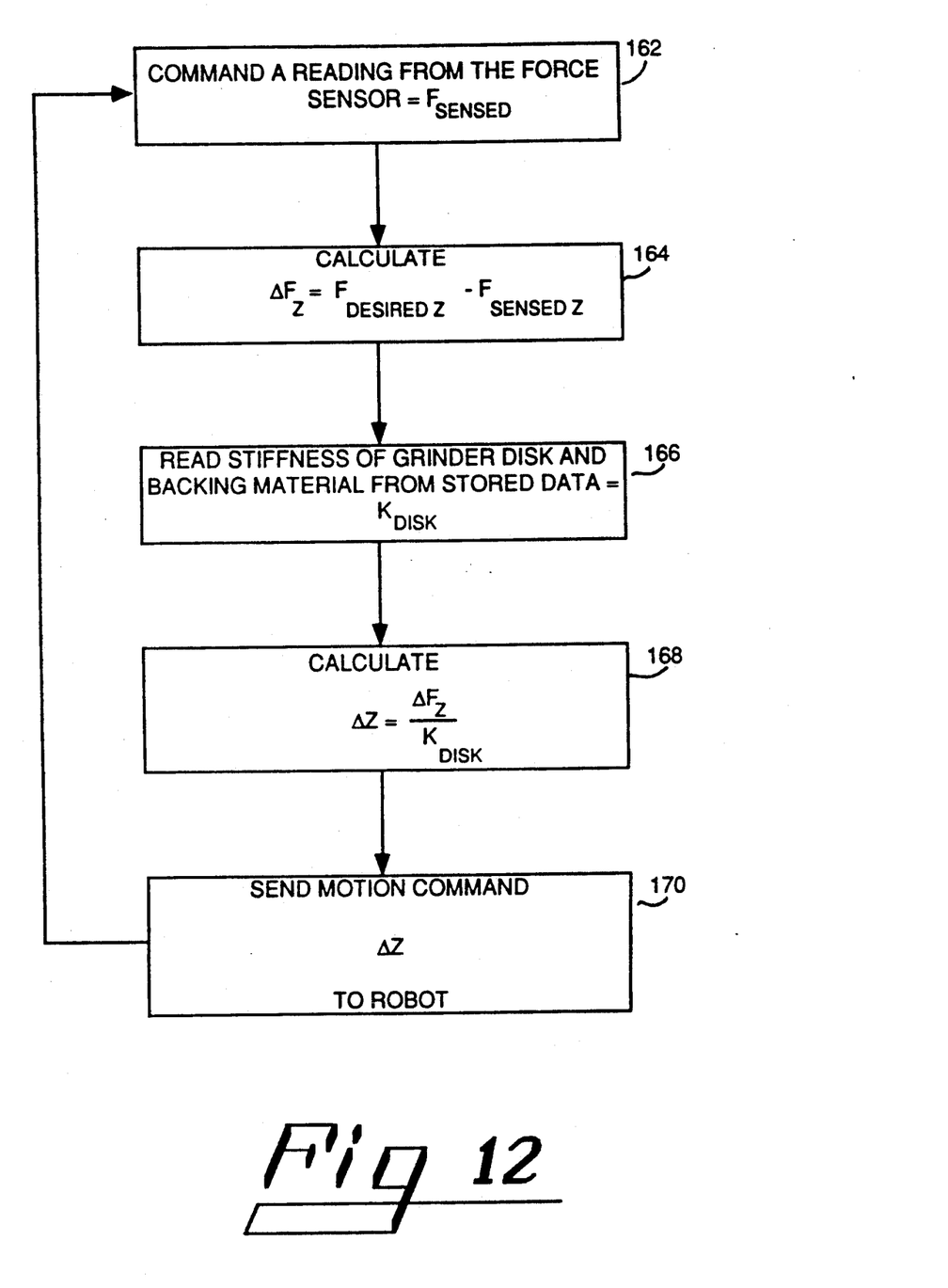
FIG. 12 is a flow chart of a routine for computing the adjustment of the height of the robot to maintain the desired contact force on the die.

The adjustment in the height of the robot to maintain the desired contact force is computed as indicated in FIG. 12 by first commanding in step 162 a reading from the force sensor $F_{sensed}$. Then the error in force, $\Delta F_Z$, is calculated as in step 164 as $F_{desiredZ} - F_{sensedZ}$. Each Z represents the vector component of measured force perpendicular to the surface of the die. This can be approximated by using the component of force sensor output that is parallel to the grinder's shaft. The stiffness of the grinder disk and backing material $K_{disk}$ is then read in step 166 from the stored data. $\Delta Z$ is then calculated in step 168 according to the expression $\Delta Z = \Delta F_Z / K_{disk}$, and finally the motion update command $\Delta Z$ is sent in step 170 to the robot (step 142) so that the robot moves $\Delta Z$ closer to, or $\Delta Z$ farther from, the die surface, depending upon whether the value of Z is positive or negative, respectively.

Figure 13:
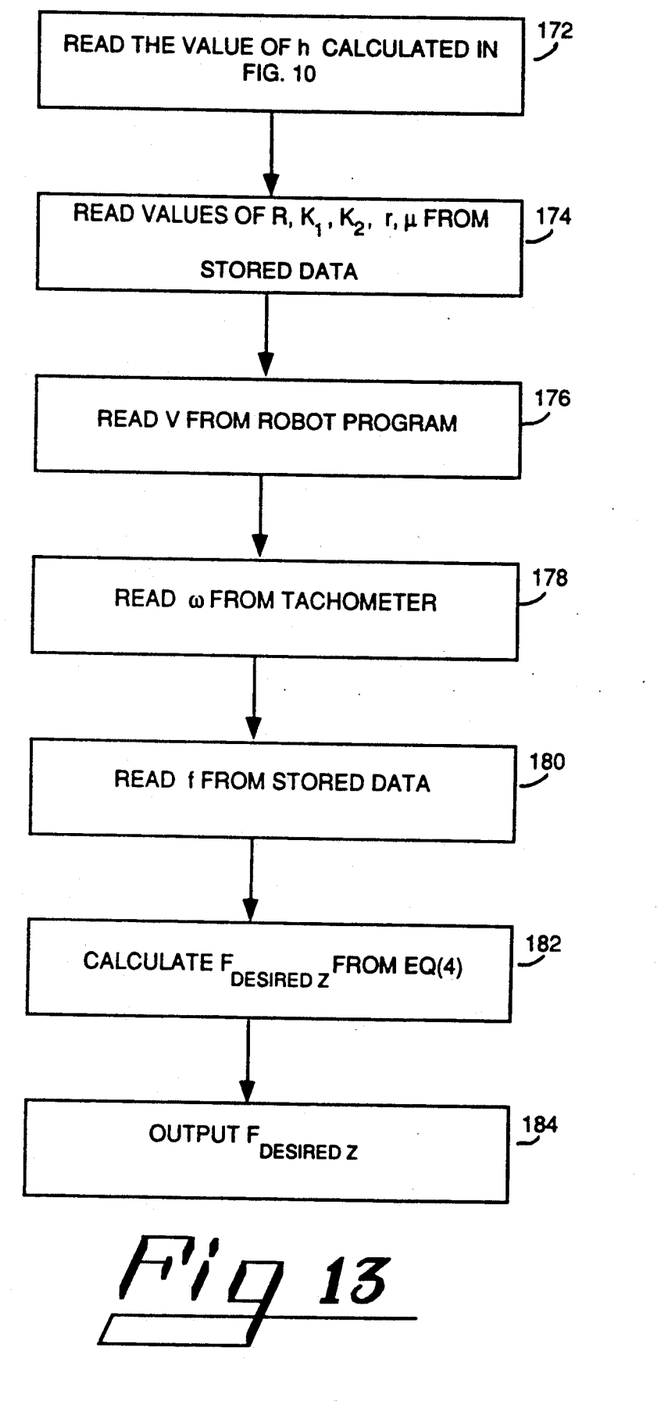
FIG. 13 is a flow chart of a routine for calculating the desired force of the grinder on the die surface.

The desired contact force $F_{desired}$ is calculated as shown in FIG. 13, by reading in step 172 the value of h calculated in FIG. 10. Then the values of R, $K_1$, $K_2$, r and $\mu$, are read in step 174 from stored data. The velocity V is read from the robot program, step 176. The program is produced in step 112, FIG. 7. Then the tachometer speed $\omega$ is read in step 178 from the tachometer, and the value of f is read in step 180 from the stored data. The value of $F_{desiredZ}$ is then calculated in step 182 as $F_N$ given by equation (4). Finally, the system outputs $F_{desiredZ}$ in step 184 for use in step 164.

Explanations for running the robot along a precalculated path and for calculating the path for the robot given the shape of the die, are explained in *Robot Manipulators: Mathematics, Programming, and Control* by Richard Paul, MIT Press, Cambridge, Mass., 1981. Implementing robot force control is explained in "Closed Loop Force Control for a Robotic Grinding System", by Allan R. Tate, MIT SM Thesis, June 1986. Calibrating a computer vision system is explained in "Vision and Force-Controlled Robot Weld Bead Grinding System", by Alan B. Todtenkopf, MIT SM Thesis, January 1988. The model of grinding given in equation (2), the experimental methods for obtaining constants $K_1$ and $K_2$, and the way to obtain good surface finish from rough grits by controlling feed velocity are explained in "Process Modeling of Coated Abrasive Disk Grinding as Part of a Robotic Grinding Solution" by Douglas E. Ivers, MIT SM Thesis, September 1985. Calibrating a robot is explained in "Robot Calibration: Method and Results" by Christopher A. Lozinski, MIT SM Thesis, June 1984. See also: "A Taguchi Study on Optimizing Robot Grinding of Cast Iron Stamping Dies", Eugene Tung, MIT Mechanical Engineering Department, SM Thesis, September 1989.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An automatic grinding system for grinding a surface having a predetermined pattern of raised and lower regions, comprising:

means for grinding the raised regions down to the level of the lower regions, said means including a grinder, said grinder having a flexible member for supporting a grinding medium selected to maintain the surface of the raised regions flat during the grinding of the surface;

means for controlling the grinding force, the grinding speed and the velocity over the surface of the means for grinding;

means for sensing the width of at least one of the regions;

means, responsive to the means for sensing, for determining the height of the raised regions above the lower region; and means, responsive to said means for determining the height, for driving said means for controlling to set the grinding speed and force and the velocity over the surface of the means for grinding.

2. The automatic grinding system of claim 1 in which said means for grinding includes a robot arm.

3. The automatic grinding system of claim 1 in which said grinder is a rotary grinder.

4. The automatic grinding system of claim 3 in which said flexible member is a disk.

5. The automatic grinding system of claim 1 in which said means for grinding includes a grinding medium of approximately 50-120 grit.

6. The automatic grinding system of claim 1 in which said means for controlling includes a robot controller.

7. The automatic grinding system of claim 1 in which said means for sensing includes a TV camera.

8. The automatic grinding system of claim 1 in which said means for driving include means for detecting the force applied between the means for grinding and the surface.

9. The automatic grinding system of claim 1 in which said means for driving includes means for ascertaining the grinding speed of said means for grinding.

10. The automatic grinding system of claim 1 in which said means for controlling includes means for automatically ascertaining the sharpness of the means for grinding.

11. The automatic grinding system of claim 1 in which said means for grinding includes means for changing grinding media.

12. An automatic grinding method for grinding a surface having a predetermined pattern of raised and lower regions, comprising:
sensing the width of at least one of those regions;
determining the height of the raised region above the lower region in response to the sensed width;
selecting the grinding speed and force and the velocity of the grinder over the surface in response to the determined height of the raised region; and
selecting the grit size of the grinding medium to obtain a predetermined surface shape of the ground surface during grinding.

13. The automatic grinding method of claim 12 including:
automatically determining the sharpness of the grinding medium;
automatically adjusting the selected speed and force in response to the sharpness; and
changing to new grinding media when the sharpness falls below a preset limit.

14. The automatic grinding method of claim 12 including changing to different grinding media when grinding is nearly complete.

15. The automatic grinding method of claim 12 wherein said predetermined surface shape of the ground surface is flat.

16. The automatic grinding method of claim 12 including selecting the grit size of the grinding medium, and selecting the velocity of the grinder over the surface based on the grit size to obtain a predetermined surface finish.

* * * * *